(12) United States Patent
Jamadagni et al.

(10) Patent No.: US 9,313,734 B2
(45) Date of Patent: Apr. 12, 2016

(54) METHOD AND SYSTEM FOR EMPLOYING DISCONTINUOUS RECEPTION CONFIGURATIONS IN A WIRELESS NETWORK ENVIRONMENT

(71) Applicant: Samsung Electronics Co., Ltd., Gyeonggi-do (KR)

(72) Inventors: Satish Nanjunda Swamy Jamadagni, Bangalore (IN); Sarvesha Anegundi Ganapathi, Bangalore (IN); Pradeep Krishnamurthy Hirisave, Bangalore (IN)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/355,550

(22) PCT Filed: Oct. 31, 2012

(86) PCT No.: PCT/KR2012/009076
§ 371 (c)(1),
(2) Date: Apr. 30, 2014

(87) PCT Pub. No.: WO2013/066053
PCT Pub. Date: May 10, 2013

(65) Prior Publication Data
US 2014/0254451 A1    Sep. 11, 2014

(30) Foreign Application Priority Data
Oct. 31, 2012    (IN) .......................... 3729/CHE/2011

(51) Int. Cl.
*H04W 4/00*    (2009.01)
*H04W 52/02*    (2009.01)
*H04W 76/04*    (2009.01)

(52) U.S. Cl.
CPC ...... *H04W 52/0209* (2013.01); *H04W 52/0216* (2013.01); *H04W 76/048* (2013.01)

(58) Field of Classification Search
CPC ......... H04L 47/10; H04L 47/30; H04L 47/11; H04L 47/12; H04L 47/35; H04L 47/32; H04L 43/50; H04L 43/0852; H04L 43/08; H04W 24/00; H04B 17/003
USPC ......... 370/229, 235, 252, 311, 332, 349, 322, 370/329, 341, 314
See application file for complete search history.

(56) References Cited

U.S. PATENT DOCUMENTS 8,626,167 B2 * 1/2014 Futaki et al. .................. 455/436
2011/0199910 A1  8/2011 Oh et al.
(Continued)

FOREIGN PATENT DOCUMENTS

EP    2355602 A1    8/2011

OTHER PUBLICATIONS

International Search Report dated Mar. 27, 2013 in connection with International Patent Application No. PCT/KR2012/009076, 3 pages.
(Continued)

*Primary Examiner* — Brenda H Pham

(57) ABSTRACT

The present invention provides a method of selecting and applying Discontinuous Reception (DRX) configurations in a wireless network environment. In one embodiment, a method includes obtaining location and time information associated with user equipment, and selecting at least one DRX configuration suitable for one or more applications miming on the user equipment from a plurality of DRX configurations based on location and time information. The method also includes transmitting information associated with the selected DRX configuration to a network entity so that the network entity applies the selected DRX configuration for the user equipment.

20 Claims, 7 Drawing Sheets

(56) References Cited

U.S. PATENT DOCUMENTS

2011/0199951 A1    8/2011  Kwon et al.
2012/0207069 A1*  8/2012  Xu et al. .................. 370/311
2012/0263051 A1*  10/2012  Willars et al. ............ 370/252
2013/0107727 A1*  5/2013  Lunden et al. ........... 370/252

OTHER PUBLICATIONS

Written Opinion of International Searching Authority dated Mar. 27, 2013 in connection with International Patent Application No. PCT/KR2012/009076, 4 pages.

* cited by examiner

METHOD AND SYSTEM FOR EMPLOYING DISCONTINUOUS RECEPTION CONFIGURATIONS IN A WIRELESS NETWORK ENVIRONMENT

CROSS-REFERENCE TO RELATED APPLICATION(S)

The present application claims priority under 35 U.S.C. §365 to International Patent Application No. PCT/KR2012/009076 filed Oct. 31, 2012, entitled "METHOD AND SYSTEM FOR EMPLOYING DISCONTINUOUS RECEPTION CONFIGURATIONS IN A WIRELESS NETWORK ENVIRONMENT". International Patent Application No. PCT/KR2012/009076 claims priority under 35 U.S.C. §365 and/or 35 U.S.C. §119(a) to Indian Patent Application No. 3729/CHE/2011 filed Oct. 31, 2011 and Indian Patent Application No. 3729/CHE/2011 filed Oct. 31, 2012 which are incorporated herein by reference into the present disclosure as if fully set forth herein.

TECHNICAL FIELD

The present invention generally relates to the field of wireless communication environment, and more particularly relates to employing Discontinuous Reception (DRX) configurations in a wireless communication environment.

BACKGROUND ART

With battery powered user equipments (UEs), there is always a need to reduce power consumption in the UEs so as to increase battery life. In order to improve battery life, when the user equipment is not in an active mode of operation (i.e., not transmitting or receiving traffic information, such as SMS, video multi-media or voice data in a voice or data call), the UE enters an power saving mode of operation, during which some of the components of the UE are powered off to save battery power. During this mode, the components of the UE that are required to monitor the signalling signals from a network entity will still consume power but this is small compared to the power consumption by the UE during the active time.

In a wireless communication technology such as Long Term Evolution (LTE), UEs employ discontinuous reception to conserve battery power. DRX operation allows UEs to enter power save mode during regular intervals and wake up at specific time instances to receive data packets from a network entity (e.g., base station). Generally, the DRX operation is defined by an active period and a sleep period. A combination of active period and sleep period is known as one DRX cycle. The length of the active period indicates time duration for which the UE should operate in wake up mode and the length of the sleep period indicates time duration for which the UE should operate in the power saving mode. The sum of active period length and the sleep period length is known as a DRX cycle length. Typically, a network entity determines a length of a DRX cycle considering quality of service requirements of a service activated in the UE.

DISCLOSURE OF INVENTION

Technical Problem

With the advancement of technology, a large number of applications are made available on UE. Each application has distinct traffic characteristics as compared to other applications. Therefore, amount of data transmission and reception during an active period depends on class and number of applications running on the UE. For example, a long active period in a DRX cycle for an application having very less data traffic may lead to increased power consumption as the UE have to operate in the wake up mode in absence of data traffic.

Solution to Problem

In accordance with a first aspect of the present invention, there is provided a method of selecting Discontinuous Reception (DRX) configuration in a user equipment, comprising: obtaining location and time information associated with a user equipment; selecting at least one Discontinuous Reception (DRX) configuration suitable for one or more applications running on the user equipment from a plurality of DRX configurations based on location and time information; and transmitting information associated with the selected DRX configuration to a network entity so that the network entity applies the selected DRX configuration for the user equipment.

Advantageous Effects of Invention

According to the present invention, the mobile terminal can communicate with a base station more efficiently.

The drawings described herein are for illustration purposes only and are not intended to limit the scope of the present disclosure in any way.

MODE FOR THE INVENTION

The present invention provides a method and system for employing discontinuous reception configurations in a wireless network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
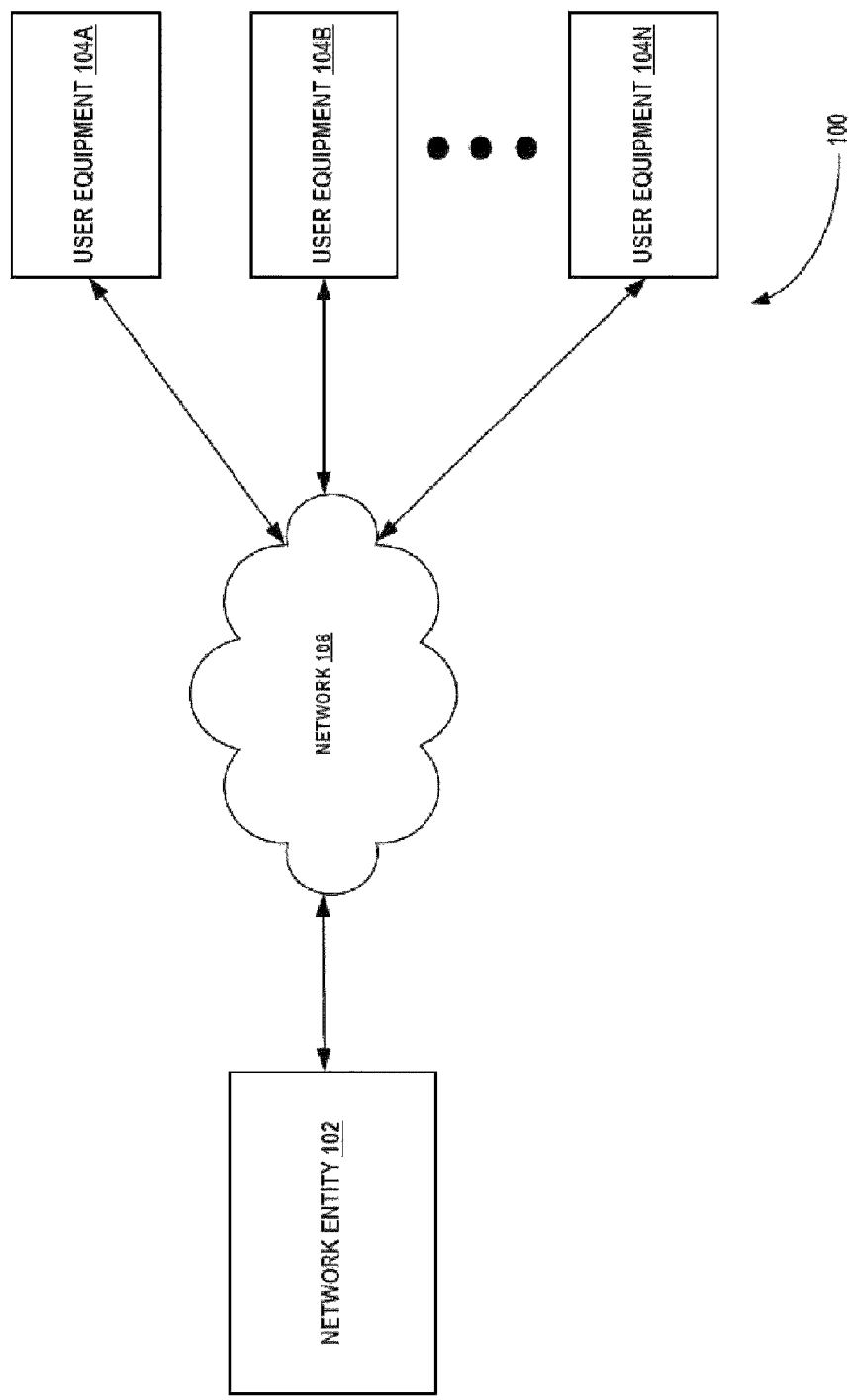
FIG. 1 illustrates a block diagram of an exemplary wireless network system, according to one embodiment.

FIG. 1 illustrates a block diagram 100 of an exemplary wireless network system, according to one embodiment. In FIG. 1, the wireless network system includes a network entity 102, a plurality of user equipments 104A-N connected to the network entity via a network 106. The network entity 102 may include a evolved Node B, a Mobility Management Entity or any other entity of a wireless communication network. The user equipments 104A-N may include smart phones, personal digital assistants, tablet computers, and the like.

In one embodiment, the network entity 102 monitors pattern of application usage at each of the user equipments 104A-N at different location and at different times and determines a set of DRX configurations applicable for each of the user equipments 104A-N based on the pattern of application usage. For example, the network entity 102 determines applications that likely to be used at different locations and time and derives a set of DRX configurations suitable for traffic characteristics of the determined applications.

When the user equipment reaches a particular location at a specific time, the network entity 102 selects and applies a DRX configuration suitable for applications that are likely to be used on the user equipments at the particular location and time from the set of DRX configurations. Moreover, the network entity 102 notifies the selection of the respective DRX configuration to each of the user equipments 104A-N so that the user equipments 104A-N uses the DRX configuration for communication with the network entity 102.

In an alternate embodiment, each of the user equipments 104A-N may perform the above steps instead of the network entity 102.

Figure 2:
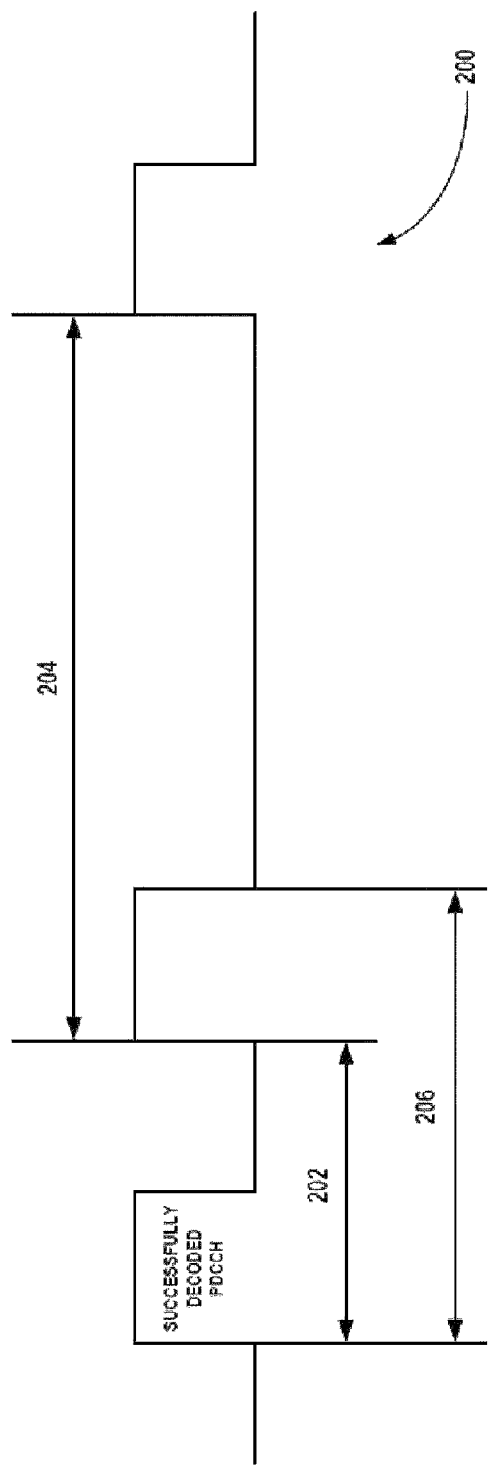
FIG. 2 is a schematic representation of a discontinuous reception (DRX) configuration, in the context of the invention.

FIG. 2 is a schematic representation of a discontinuous reception (DRX) configuration 200, in the context of the invention. The DRX configuration typically consist of parameters such as DRX short cycle 202, DRX long cycle 204, and DRX inactivity timer 206.

The DRX short cycle 202 and the DRX long cycle 204 specify periodic repetition of ON duration timer which is a fixed value. During the ON duration, a user equipment monitors a physical downlink control channel (PDCCH) to determine if there is any transmission over the allocated PDCCH. The DRX inactivity timer 206 defines a period during which the user equipment shall stay awake monitoring the PDCCH after last successful decoding of the PDCCH.

Figure 3:
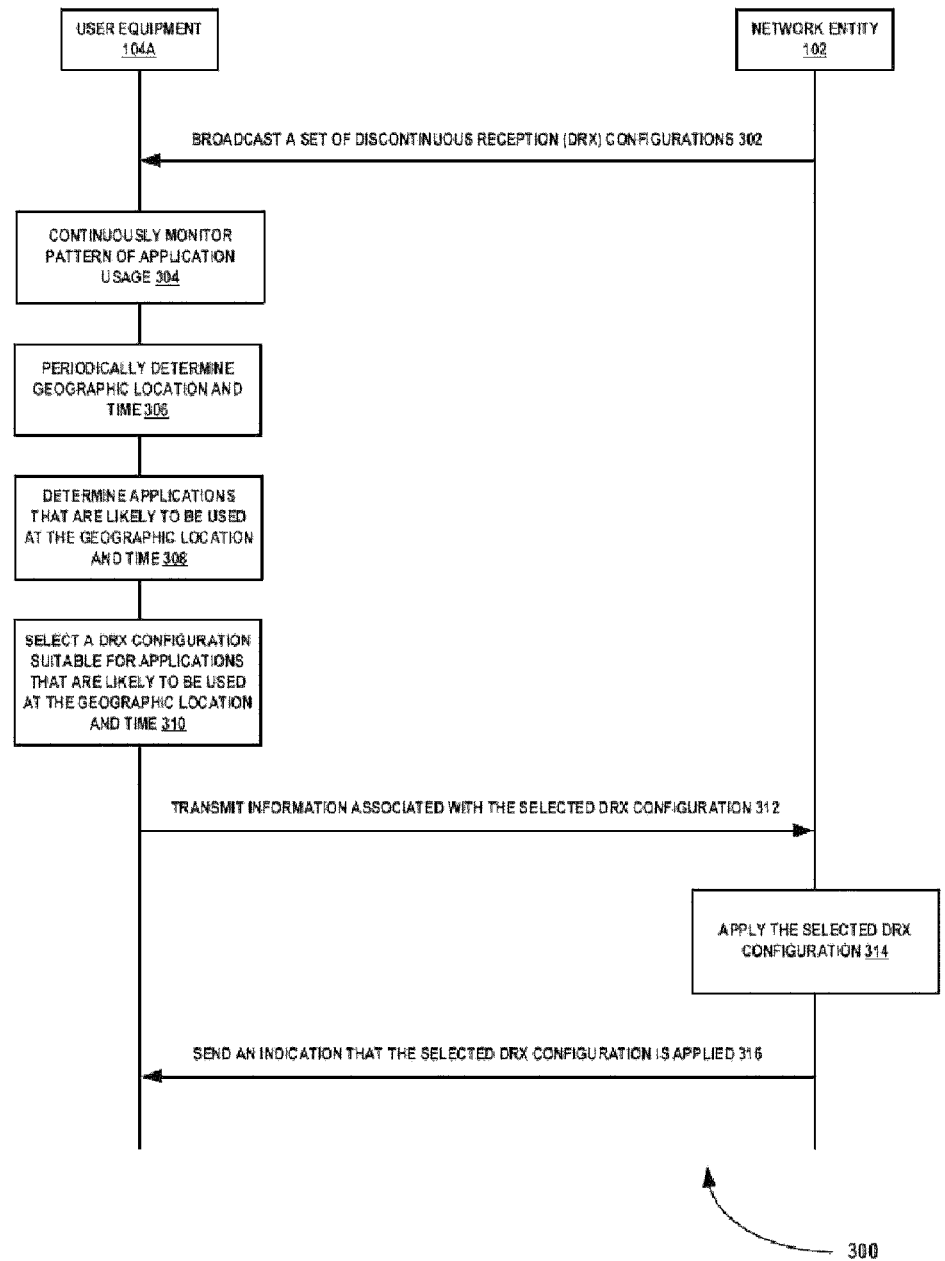
FIG. 3 is a flowchart diagram illustrating an exemplary method of applying a DRX configuration based on location and time associated with a user equipment, according to one embodiment.

FIG. 3 is a flowchart diagram 300 illustrating an exemplary method of applying a DRX configuration based on location and time associated with a user equipment, according to one embodiment. At step 302, the network entity 102 sends a plurality of discontinuous reception (DRX) configurations to the user equipment 104A. At step 304, the user equipment 104A continuously monitors a pattern of application usage when the user equipment 104A is in different locations at different times of a day.

Consider that the user equipment 104A is operating in connected mode and is located in a geographic location 'A' at a specific time 'T'. In such case, the user equipment 104A determines a geographic location (e.g., geographical coordinates or cell identifier) and time at which the user equipment 104A is at a particular geographic location, at step 306.

At step 308, the user equipment 104A determines one or more applications that are likely to be used when the user equipment 104A is located in the particular geographical location at the specific time using the monitored pattern of application usage. At step 310, the user equipment 104A selects a DRX configuration(s) suitable for the one or more applications that are likely to be used when the user equipment 104A is located in the particular geographical location at the specific time from a set of DRX configurations. At step 312, the user equipment 104A transmits information associated with the selected DRX configuration(s) to the network entity 102. In some embodiments, the user equipment 104A transmits DRX inactivity timer, long DRX cycle, and short DRX cycle in the information associated with the selected DRX configuration(s). In other embodiments, each of the set of DRX configurations provided by the network entity 102 is indexed by a unique identifier. In these embodiments, the user equipment 104A indicates a unique identifier associated with the DRX configuration in the information of the selected DRX configuration to the network entity 102.

Based on the information, the network entity 102 applies the selected DRX configuration suitable for the applications running on the user equipment 104A in the particular geographical location at the specific time, at step 314. At step 316, the network entity 102 sends an indication to the user equipment 104A that the selected DRX configuration is applied. Accordingly, the user equipment 104A uses the DRX configuration during connected mode of operation.

Figure 4:
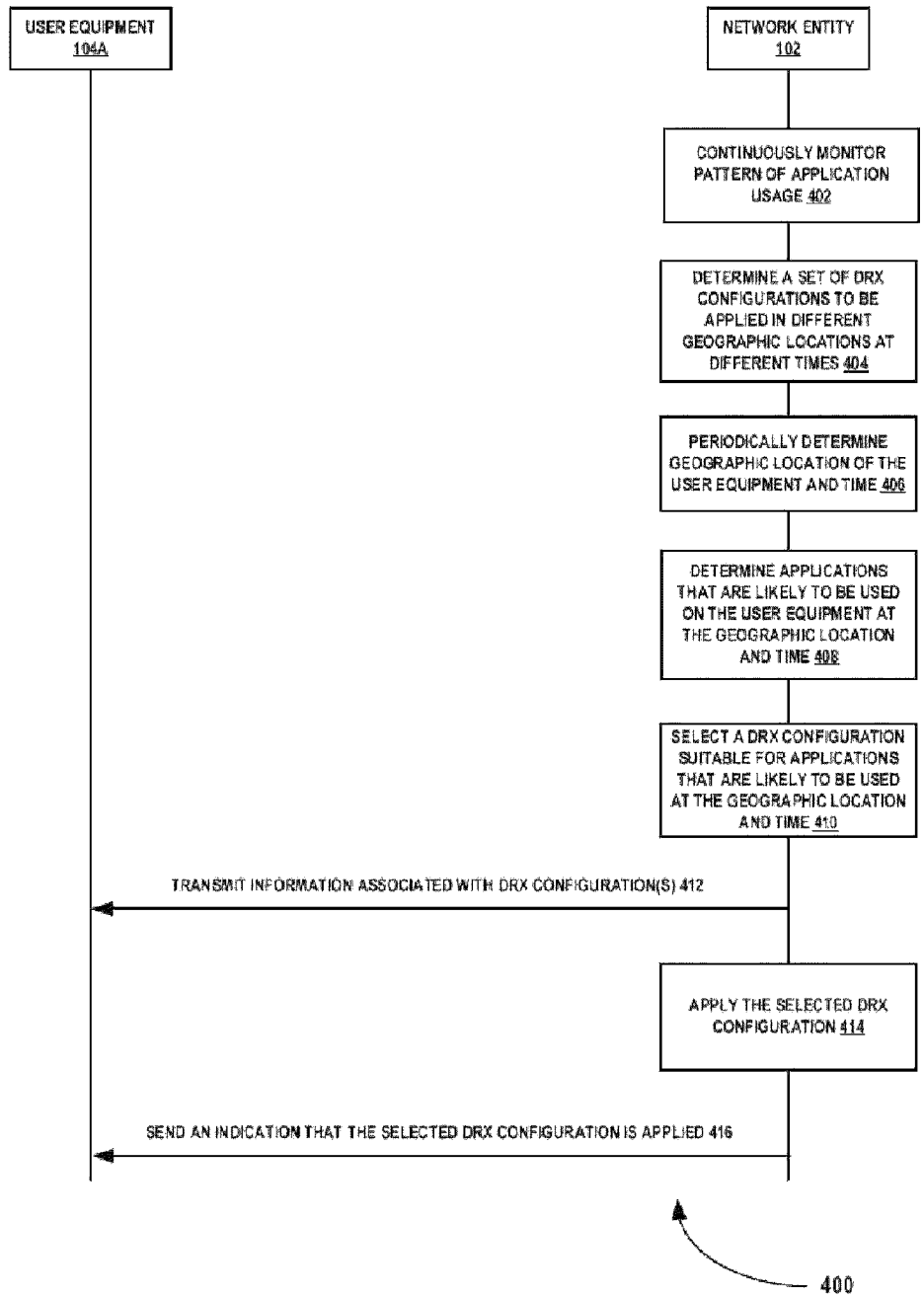
FIG. 4 is a flowchart diagram illustrating an exemplary method of applying a DRX configuration based on location and time associated with a user equipment, according to another embodiment.

FIG. 4 is a flowchart diagram 400 illustrating an exemplary method of applying a DRX configuration based on location and time associated with a user equipment, according to another embodiment. At step 402, the network entity 102 continuously monitors a pattern of application usage in the user equipment 104A when the user equipment 104A is in different locations at different times of a day. At step 404, the network entity 102 determines a set of DRX configurations to be applied in the different geographic locations of the user equipment at different times of the day based on the application usage patterns.

Now consider that the user equipment 104A is operating in connected mode and is located in a geographic location 'A' at a specific time 'T'. In such case, the network entity 102 determines a geographic location of the user equipment 104A and time at which the user equipment 104A is at a particular geographic location, at step 406. At step 408, the network entity 102 determines one or more applications that are likely to be used at the user equipment 104A when the user equipment 104A is located in the particular geographical location at the specific time.

At step 410, the network entity 102 selects a DRX configuration(s) suitable for the one or more applications that are likely to be used when the user equipment 104A is located in the particular geographical location at the specific time from a set of DRX configurations. At step 412, the network entity 102 transmits information associated with the selected DRX configuration(s) to the user equipment 104A. The information associated with the selected DRX configuration(s) may include DRX inactivity timer, long DRX cycle, short DRX cycle, DRX short cycle timer and so on. In one embodiment, the network entity 102 provides information of a DRX configuration applicable in a particular geographic location at a specific time of a day from the set of DRX configurations to the user equipment 104A when the user equipment is at the specific geographic location at the specific time of the day where the DRX configuration is applicable. In another embodiment, the network entity 102 provides the set of DRX configurations applicable in different geographic locations of the user equipment at different times of a day to the user equipment 104A. In this embodiment, the user equipment 104A selects a suitable DRX configuration from the set of DRX configuration based on the geographic location and time.

In an exemplary implementation, the network entity 102 transmits information of the DRX configuration to be applied in specific geographic locations in a radio resource connection re-configuration message. Exemplary radio resource connection reconfiguration message is illustrated in APPENDIX 'A'. In another exemplary implementation, the network entity 102 transmits information of the DRX configuration to be applied in specific geographic locations in a MAC main configuration information element or radio resource configuration information element. In some cases, the MAC main configuration information element can be part of the radio resource configuration information element. Exemplary MAC main configuration information element is illustrated in APPENDIX 'B'. In yet another exemplary implementation, the network entity 102 transmits information of the DRX configuration to be applied in specific geographic locations in a new message or information element.

At step 414, the network entity 102 applies the selected DRX configuration suitable for the applications running on the user equipment 104A in the particular geographical location at the specific time. At step 416, the network entity 102 notifies that the selected DRX configuration is applied for communication during connected mode of operation. Accordingly, the user equipment 104A uses the DRX configuration during connected mode of operation.

In accordance with the foregoing description, if multiple applications are running the user equipment 104A, the user equipments 104A-N or the network entity 102 may choose a combination of multiple DRX configurations suitable for traffic characteristics associated with multiple applications. In such a case, the user equipments 104A-N or the network entity generates a new DRX configuration by combining multiple DRX configurations in addition to the set of DRX configurations. The user equipments 104A-N may indicate a combination DRX configuration or unique identifiers of the multiple DRX configurations to the network entity. In an example, the user equipment 104A may indicate to the network entity 102 that a DRX configuration that emerges from DRX configurations 2 and 3 is applicable.

Figure 5:
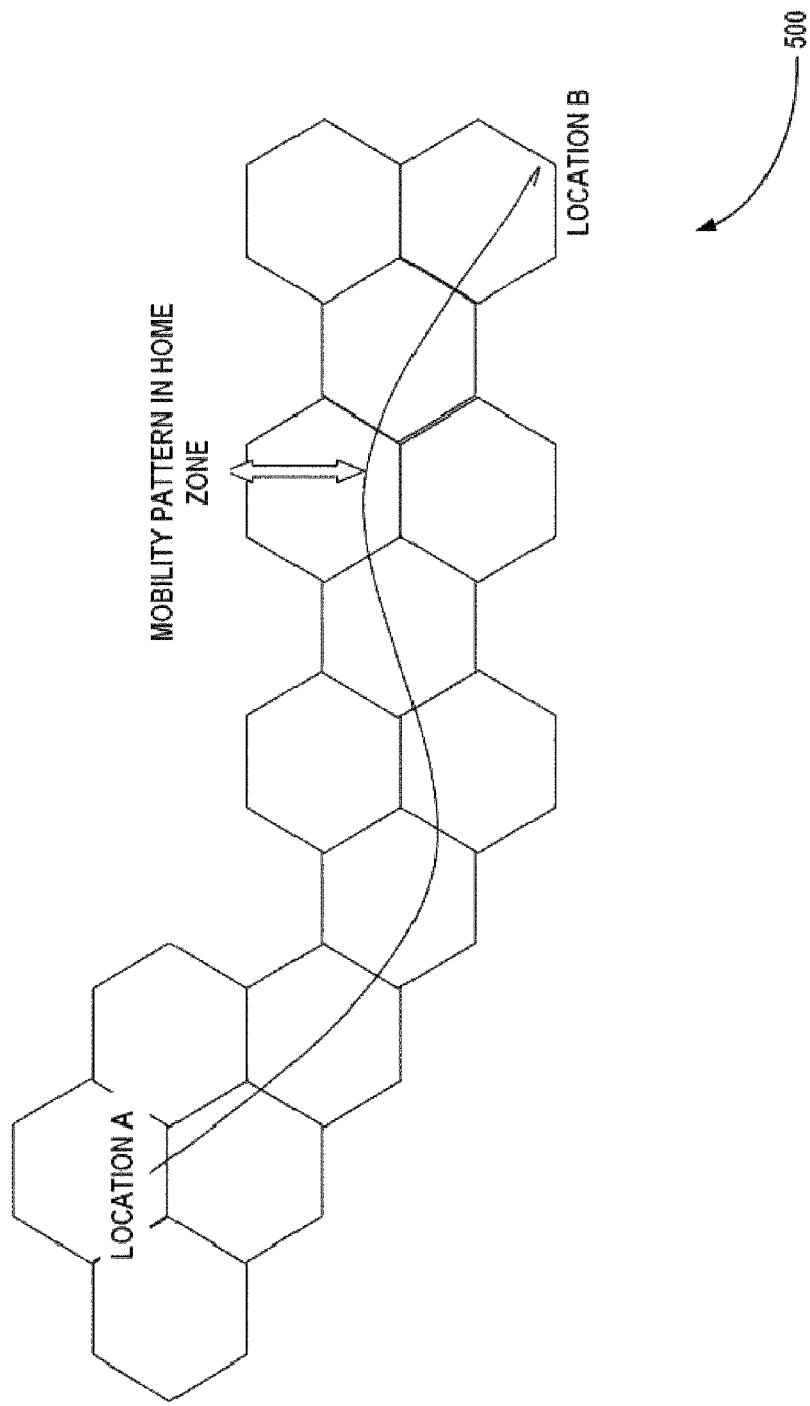
FIG. 5 illustrates a schematic representation of a mobility pattern associated with a user equipment.

FIG. 5 illustrates a schematic representation of a mobility pattern associated with a user equipment. When a user from a geographic location 'A' to a geographic location 'B', the user may use diverse range of applications such as gaming, email, maps, news, photo apps, ringtones, search, social networking, travel, weather, video, music and so on. When the user is within a home zone (e.g., area usually traversed by the user), pattern of application usage is monitored and a relationship between location and time and applications usage is established. Also when the user is outside the home zone (i.e., foreign zone), pattern of application usage is monitored and a relationship between location and time and applications usage is established. For example, stationary users in home zone tend to listen to music, download videos, and access social networking applications. On the other hand, stationary users in the foreign zone tend to news application, photo application, travel and map application, weather application, and connectivity applications. According to the present invention, a DRX configuration suitable for traffic characteristics of the applications is selected from a set of DRX configurations based on whether the user equipment is in the home zone or outside the home zone at a specific time using the established relationship.

Figure 6:
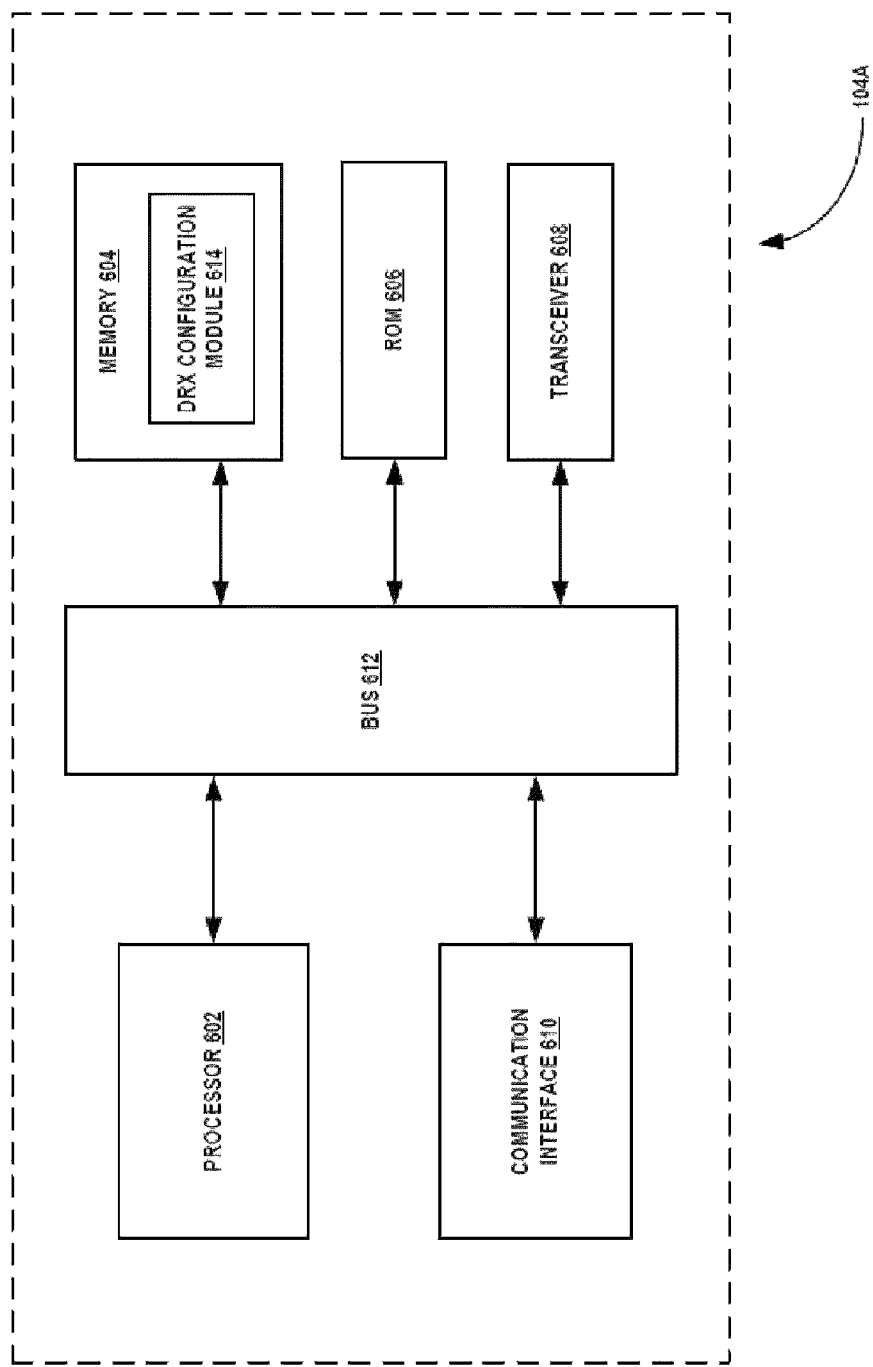
FIG. 6 illustrates a block diagram of a user equipment, such as those shown in FIG. 1, showing various components for implementing embodiments of the present subject matter.

FIG. 6 illustrates a block diagram of the user equipment 104A, such as those shown in FIG. 1, showing various components for implementing embodiments of the present subject matter. In FIG. 6, the user equipment 104A includes a processor 602, memory 604, a read only memory (ROM) 606, a transceiver 608, a communication interface 610, and a bus 612.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 may be volatile memory and non-volatile memory. The memory 604 may include a DRX configuration module 614 for monitoring application usage pattern, selecting a DRX configuration based on geographic location and time information, transmitting information of the DRX configuration to the network entity 102 and using the DRX configuration during communication with the network entity 102, according to the embodiments illustrated in FIGS. 1 to 4. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules including functions, procedures, data structures, and application programs, for performing tasks, defining abstract data types, or low-level hardware contexts. The DRX configuration module 614 may be stored in the form of machine-readable instructions on any of the above-mentioned storage media and is executable by the processor 602. For example, a computer program may include the machine-readable instructions capable of selecting a DRX configuration based on geographic location and time information, transmitting information of the DRX configuration to the network entity 102 and using the DRX configuration during communication with the network entity 102, according to the teachings and herein described embodiments of the present subject matter. The computer program may be included on a non-transitory computer-readable storage medium and loaded from the storage medium onto a hard drive in the non-volatile memory.

The transceiver 608 is configured for indicating information of selected DRX configuration to the network entity 102, and transmitting and receiving information/data to/from the network entity 102 according to the selected DRX configuration. The components such as the ROM 606, the communication interface 610, and the bus 612 are well known to the person skilled in the art and hence the explanation is thereof omitted.

Figure 7:
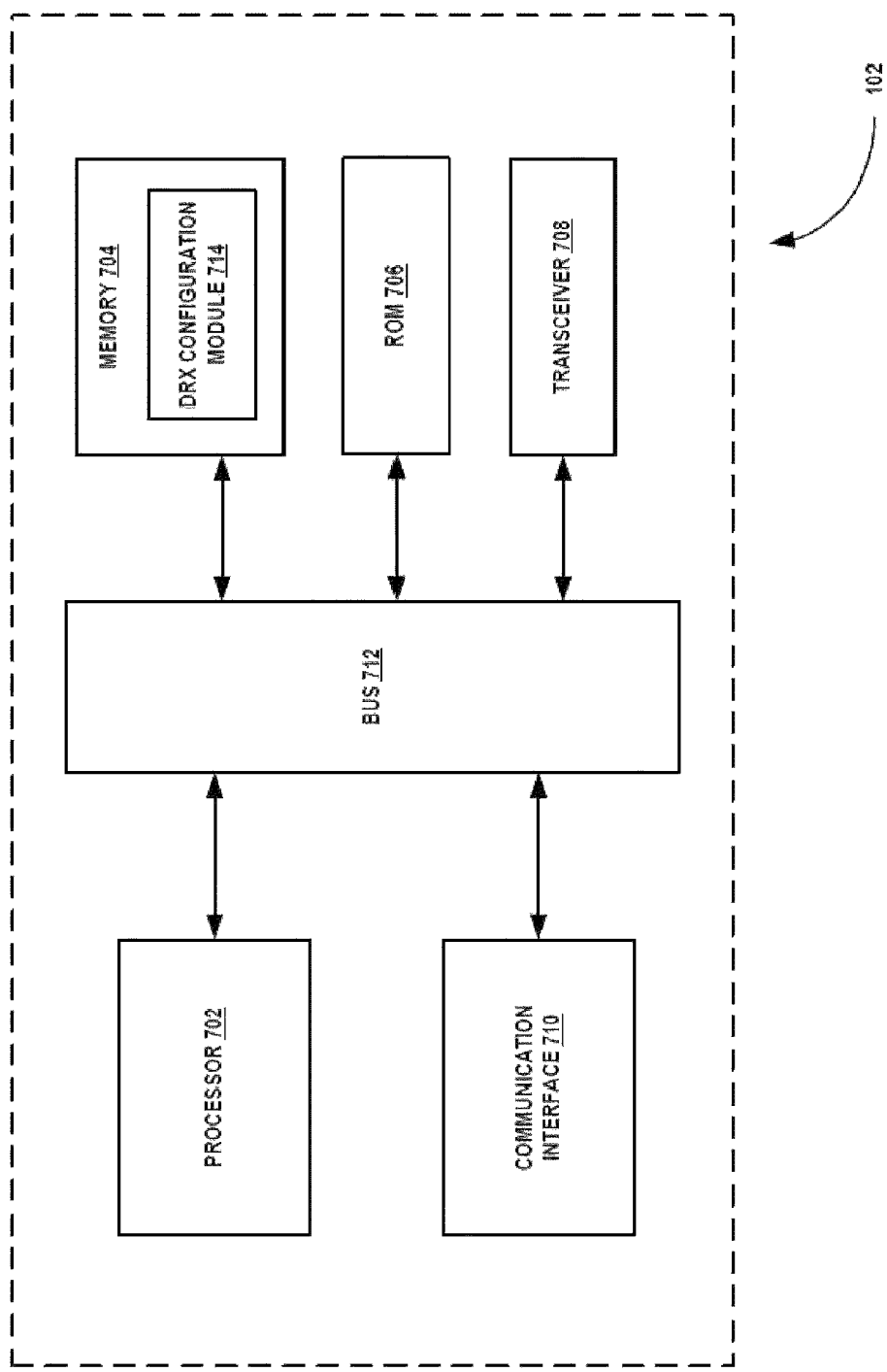
FIG. 7 illustrates a block diagram of a network entity, such as those shown in FIG. 1, showing various components for implementing embodiments of the present subject matter.

FIG. 7 illustrates a block diagram of the network entity 102, such as those shown in FIG. 1, showing various components for implementing embodiments of the present subject matter. In FIG. 7, the network entity 102 includes a processor 702, memory 704, a read only memory (ROM) 706, a transceiver 708, a communication interface 710, and a bus 712.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be volatile memory and non-volatile memory. The memory 704 may include a DRX configuration module 714 for monitoring pattern of application usage at the user equipment 104A, determining a set of DRX configurations suitable for traffic characteristics of the applications in the user equipment 104A, selecting a DRX configuration from the set of DRX configurations based on location and time information, and applying the selected DRX configuration for communication with the user equipment 104A, according to the embodiments illustrated in FIGS. 1 to 4. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules including functions, procedures, data structures, and application programs, for performing tasks, defining abstract data types, or low-level hardware contexts. The DRX configuration module 714 may be stored in the form of machine-readable instructions on any of the above-mentioned storage media and is executable by the processor 702. For example, a computer program may include the machine-readable instructions capable of monitoring pattern of application usage at the user equipment 104A, determining a set of DRX configurations suitable for traffic characteristics of the applications in the user equipment 104A, selecting a DRX configuration from the set of DRX configurations based on location and time information, and applying the selected DRX configuration for communication with the user equipment 104A, according to the teachings and herein described embodiments of the present subject matter. The computer program may be included on a non-transitory computer-readable storage medium and loaded from the storage medium to a hard drive in the non-volatile memory.

The transceiver 708 is configured for indicating information of selected DRX configuration to the user equipment 104A, and transmitting and receiving information/data to/from the user equipment 104A according to the selected DRX configuration. The components such as the ROM 706, the communication interface 710, and the bus 712 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

APPENDIX A

TABLE 1

-- ASN1STARTRRCConnectionReconfiguration ::= SEQUENCE { rrc-TransactionIdentifier RRC-TransactionIdentifier, criticalExtensions CHOICE { c1 CHOICE{ rrcConnectionReconfiguration-r8 RRCConnectionReconfiguration-r8-IEs, spare7 NULL, spare6 NULL, spare5 NULL, spare4 NULL, spare3 NULL, spare2 NULL, spare1 NULL }, criticalExtensionsFuture SEQUENCE { } } }RRCConnectionReconfiguration-r8-IEs ::= SEQUENCE { measConfig MeasConfig OPTIONAL, -- Need ON mobilityControlInfo MobilityControlInfo OPTIONAL, -- Cond HO dedicatedInfoNASList SEQUENCE (SIZE(1..maxDRB)) OF DedicatedInfoNAS OPTIONAL, -- Cond nonHO radioResourceConfigDedicated RadioResourceConfigDedicated OPTIONAL, -- Cond HO-toEUTRA security-ConfigHO SecurityConfigHO OPTIONAL, -- Cond HO nonCriticalExtension RRC-ConnectionReconfiguration-v890-IEs OPTIONAL}RRCConnectionReconfiguration-v890-IEs ::= SEQUENCE { lateNon-CriticalExtension OCTET STRING OPTIONAL, -- Need OP nonCriticalExtension RRCConnectionReconfiguration-v920-IEs OPTIONAL}RRCConnectionReconfiguration-v920-IEs ::= SEQUENCE { other-Config-r9 OtherConfig-r9 OPTIONAL, -- Need ON fullConfig-r9 ENUMERATED {true} OPTIONAL, -- Cond HO-Reestab nonCriticalExtension RRCConnectionReconfiguration-v10xy-IEs OPTIONAL}RRCConnectionReconfiguration-v10xy-IEs ::= SEQUENCE { sCellToReleaseList-r10 SCellToReleaseList-r10 OPTIONAL, -- Need ON sCellToAddModList-r10 SCellToAddModList-r10 OPTIONAL, -- Need ON nonCriticalExtension SEQUENCE { } OPTIONAL -- Need OP}SCellToAddModList-r10 ::= SEQUENCE (SIZE (1..maxSCell-r10)) OF SCellToAddMod-r10SCellToAddMod-r10 ::= SEQUENCE { sCellIndex-r10 SCellIndex-r10, cellIdentification SEQUENCE { physCellId-r10 PhysCellId, dl-CarrierFreq ARFCN-ValueEUTRA } OPTIONAL, -- Cond SCellAdd radioResourceConfigCommonSCell-r10 RadioResourceConfigCommonSCell-r10 OPTIONAL, -- Cond SCellAdd radio-ResourceConfigDedicatedSCell-r10 RadioResourceConfigDedicatedSCell-r10 OPTIONAL, -- Cond SCellAdd2 ...}SCellToReleaseList-r10 ::= SEQUENCE (SIZE (1..maxSCell-r10)) OF SCellIndex-r10SecurityConfigHO ::= SEQUENCE { handover Type CHOICE { intraLTE SEQUENCE { securityAlgorithmConfig SecurityAlgorithm-Config OPTIONAL, -- Cond fullConfig keyChangeIndicator BOOLEAN, nextHopChainingCount NextHopChainingCount }, interRAT SEQUENCE { security-AlgorithmConfig SecurityAlgorithmConfig, nas-SecurityParamToEUTRA OCTET STRING (SIZE(6)) } }, ... DRX value; applicable location values}--ASN1STOP

APPENDIX B

TABLE 2

-- ASN1STARTMAC-MainConfig ::= SEQUENCE {ul-SCH-Config SEQUENCE {maxHARQ-Tx ENUMERATED {n1, n2, n3, n4, n5, n6, n7, n8, n10, n12, n16, n20, n24, n28, spare2, spare1} OPTIONAL, -- Need ON periodicBSR-Timer ENUMERATED {sf5, sf10, sf16, sf20, sf32, sf40, sf64, sf80, sf128, sf160, sf320, sf640, sf1280, sf2560, infinity, spare1} OPTIONAL, -- Need ON retxBSR-Timer ENUMERATED {sf320, sf640, sf1280, sf2560, sf5120, sf10240, spare2, spare1}, tti-Bundling BOOLEAN} OPTIONAL, -- Need ON drx-Config DRX-Config OPTIONAL, -- Need ON timeAlignmentTimerDedicated TimeAlignmentTimer, phr-Config CHOICE {release NULL, setup SEQUENCE {periodicPHR-Timer ENUMERATED {sf10, sf20, sf50, sf100, sf200, sf500, sf1000, infinity}, pro-hibitPHR-Timer ENUMERATED {sf0, sf10, sf20, sf50, sf100, sf200, sf500, sf1000}, dl-PathlossChange ENUMERATED {dB1, dB3, dB6, infinity}}} OPTIONAL, -- Need ON ..., [[ sr-ProhibitTimer-r9 INTEGER (0 ... 7) OPTIONAL -- Need ON]], [[sCellDeactivationTimer-r10 ENUMERATED {rf2, rf4, rf8, rf16, rf32, rf64, rf128, infinity} OPTIONAL, -- Need ON extendedBSR-Sizes-r10 BOOLEAN OPTIONAL, -- Need ON extendedPHR-r10 BOOLEAN OPTIONAL -- Need ON -- PHR type 2 configuration parameters may be introduced here -- The details of PHR type 2 (e.g. configuration parameter) are FES]]}DRX-Config ::= CHOICE {release NULL, setup SEQUENCE {onDurationTimer ENUMERATED {psf1, psf2, psf3, psf4, psf5, psf6, psf8, psf10, psf20, psf30, psf40, psf50, psf60, psf80, psf100, psf200}, drx-InactivityTimer ENUMERATED {psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, spare10, spare9, spare8, spare7, spare6, spare5, spare4, spare3, spare2, spare1}, drx-RetransmissionTimer ENUMERATED {psf1, psf2, psf4, psf6, psf8, psf16, psf24, psf33}, longDRX-CycleStartOffset CHOICE {sf10 INTEGER(0 ... 9), sf20 INTEGER(0 ... 19), sf32 INTEGER(0 ... 31), sf40 INTEGER(0 ... 39), sf64 INTEGER(0 ... 63), sf80 INTEGER(0 ... 79), sf128 INTEGER(0 ... 127), sf160 INTEGER(0 ... 159), sf256 INTEGER(0 ... 255), sf320 INTEGER(0 ... 319), sf512 INTEGER(0 ... 511), sf640 INTEGER(0 ... 639), sf1024 INTEGER(0 ... 1023), sf1280 INTEGER(0 ... 1279), sf2048 INTEGER(0 ... 2047), sf2560 INTEGER(0 ... 2559)}, shortDRX SEQUENCE {shortDRX-Cycle ENUMERATED {sf2, sf5, sf8, sf10, sf16, sf20, sf32, sf40, sf64, sf80, sf128, sf160, sf256, sf320, sf512, sf640}, drxShortCycleTimer INTEGER (1 ... 16)} OPTIONAL -- Need OR} DRX value; applicable location values}

The invention claimed is:

1. A method of selecting Discontinuous Reception (DRX) configuration by a user equipment, comprising:
   recording patterns of application usage as a function of geographic locations of the user equipment at different times of day;
   determining a set of DRX configurations to be applied in the different geographic locations of the user equipment at different times of day as a function of the application usage patterns;
   selecting a DRX configuration applicable in a particular geographic location at a specific time of a day from the set of DRX configurations when the user equipment is at the specific geographic location at the specific time of the day; and
   transmitting information associated with the selected DRX configuration to a network entity so that the network entity applies the selected DRX configuration for the user equipment.

2. The method of claim 1, wherein each of the DRX configurations is indexed as a unique number.

3. The method of claim 2, wherein the information associated with the selected DRX configuration includes an index number of the selected DRX configuration.

4. The method of claim 1, wherein each of the DRX configurations comprises DRX inactivity timer, long DRX cycle, short DRX cycle and DRX short cycle timer.

5. The method of claim 1, further comprising:
   selecting a DRX configuration applicable in a particular geographical location at a specific time of a day by combining two or more DRX configurations selected from the set of DRX configurations when two or more DRX configurations are suitable for the one or more applications running on the user equipment.

6. A user equipment comprising:
   a transceiver configured to transmit and receive signals to and from a network entity; and
   a controller configured to:
      record patterns of application usage as a function of geographic locations of the user equipment at different times of day;
      determine a set of DRX configurations to be applied in the different geographic locations of the user equipment at different times of the day based on the application usage patterns;
      select a DRX configuration in a particular geographic location at a specific time of day from the set of DRX configurations when the user equipment is at the specific geographic location at the specific time of the day; and
      transmit information associated with the selected DRX configuration to the network entity so that the network entity applies the selected DRX configuration for the user equipment.

7. The user equipment of claim 6, wherein each of the DRX configurations is indexed as a unique number.

8. The user equipment of claim 7, wherein the information associated with the selected DRX configuration includes an index number of the selected DRX configuration.

9. The user equipment of claim 6, wherein each of the DRX configurations comprises DRX inactivity timer, long DRX cycle, short DRX cycle and DRX short cycle timer.

10. The user equipment of claim 9, wherein the controller is configured to:
    select a DRX configuration applicable in a particular geographic location at a specific time of a day by combining two or more DRX configurations selected from the set of DRX configurations when two or more DRX configurations are suitable for the one or more applications running on the user equipment.

11. A method of applying Discontinuous Reception (DRX) configuration by a network entity, comprising:
profiling patterns of application usage as a function of geographic locations of a user equipment at different times of day;
determining a set of DRX configurations to be applied in the different geographic locations of the user equipment at different times of the day as a function of the application usage patterns; and
providing a DRX configuration applicable in a particular geographic location at a specific time of a day from the set of to the user equipment when the user equipment is at the specific geographic location at the specific time of the day.

12. The method of claim 11, wherein each of the DRX configurations is indexed as a unique number.

13. The method of claim 12, wherein the indication includes an index number of the selected DRX configuration.

14. The method of claim 11, wherein each of the DRX configurations comprises DRX inactivity timer, long DRX cycle, short DRX cycle and DRX short cycle timer.

15. The method of claim 13, further comprising:
generating the DRX configuration applicable in a particular geographic location at the specific time of a day by combining two or more DRX configurations selected from the set of DRX configurations when two or more DRX configurations are suitable for the one or more applications running on the user equipment.

16. A network entity comprising:
a transceiver configured to transmit and receive signals to and from a user equipment; and
a controller configured to:
profile patterns of application usage as a function of geographic locations of a user equipment at different times of day;
determine a set of DRX configurations to be applied in the different geographic locations of the user equipment at different times of the day based on the application usage patterns; and
provide a DRX configuration applicable in a particular geographic location at a specific time of a day from the set of DRX configurations to the user equipment when the user equipment is at the specific geographic location at the specific time of the day.

17. The network entity of claim 16, wherein each of the DRX configurations is indexed as a unique number.

18. The network entity of claim 17, wherein the indication includes an index number of the selected DRX configuration.

19. The network entity of claim 16, wherein each of the plurality of DRX configurations comprises DRX inactivity timer, long DRX cycle, short DRX cycle and DRX short cycle timer.

20. The network entity of claim 16, wherein the controller is configured to generate the DRX configuration applicable in the particular geographic location at the specific time of the day by combining two or more DRX configurations selected from the set of DRX configurations when two or more DRX configurations are suitable for the one or more applications running on the user equipment.

* * * * *